(12) United States Patent
Shibata

(10) Patent No.: US 7,046,477 B2
(45) Date of Patent: May 16, 2006

(54) APPARATUS AND METHOD FOR CALCULATING DISK SHIFT AMOUNT IN DISK DRIVE

(75) Inventor: Satoshi Shibata, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/000,925

(22) Filed: Dec. 2, 2004

(65) Prior Publication Data

US 2005/0128635 A1 Jun. 16, 2005

(30) Foreign Application Priority Data

Dec. 15, 2003 (JP) ............................. 2003-416142

(51) Int. Cl.
*G11B 5/596* (2006.01)
(52) U.S. Cl. .................................... 360/77.04
(58) Field of Classification Search ...................... None
See application file for complete search history.

(56) References Cited

U.S. PATENT DOCUMENTS

| | | | | |
|---|---|---|---|---|
| 5,608,586 A | * | 3/1997 | Sri-Jayantha et al. | 360/77.04 |
| 5,615,191 A | * | 3/1997 | Takeda et al. | 360/51 |
| 6,417,983 B1 | * | 7/2002 | Yatsu | 360/77.04 |
| 6,650,499 B1 | * | 11/2003 | Kusumoto | 360/77.04 |
| 6,760,183 B1 | * | 7/2004 | Kusumoto | 360/77.04 |
| 6,891,693 B1 | * | 5/2005 | Shibata | 360/77.04 |
| 2002/0126412 A1 | | 9/2002 | Shibata | |

FOREIGN PATENT DOCUMENTS

| JP | 11-39814 | 2/1999 |
|---|---|---|
| JP | 2002-230928 | 8/2002 |

* cited by examiner

*Primary Examiner*—K. Wong
(74) *Attorney, Agent, or Firm*—Pillsbury Winthrop Shaw Pittman LLP

(57) ABSTRACT

A main controller, such as a CPU, causes a runout detector to relearn a runout component using as an initial value a learned value for a runout component of a disk runout that may occur as a disk rotates, the learned value being acquired during manufacture of a disk drive. The learned value for the runout component used as the initial value is saved to a nonvolatile storage device. The main controller calculates a disk shift amount on the basis of a runout component obtained through relearning (that is, a relearned value) and the learned value acquired during the manufacture of the disk drive and used as the initial value.

8 Claims, 5 Drawing Sheets

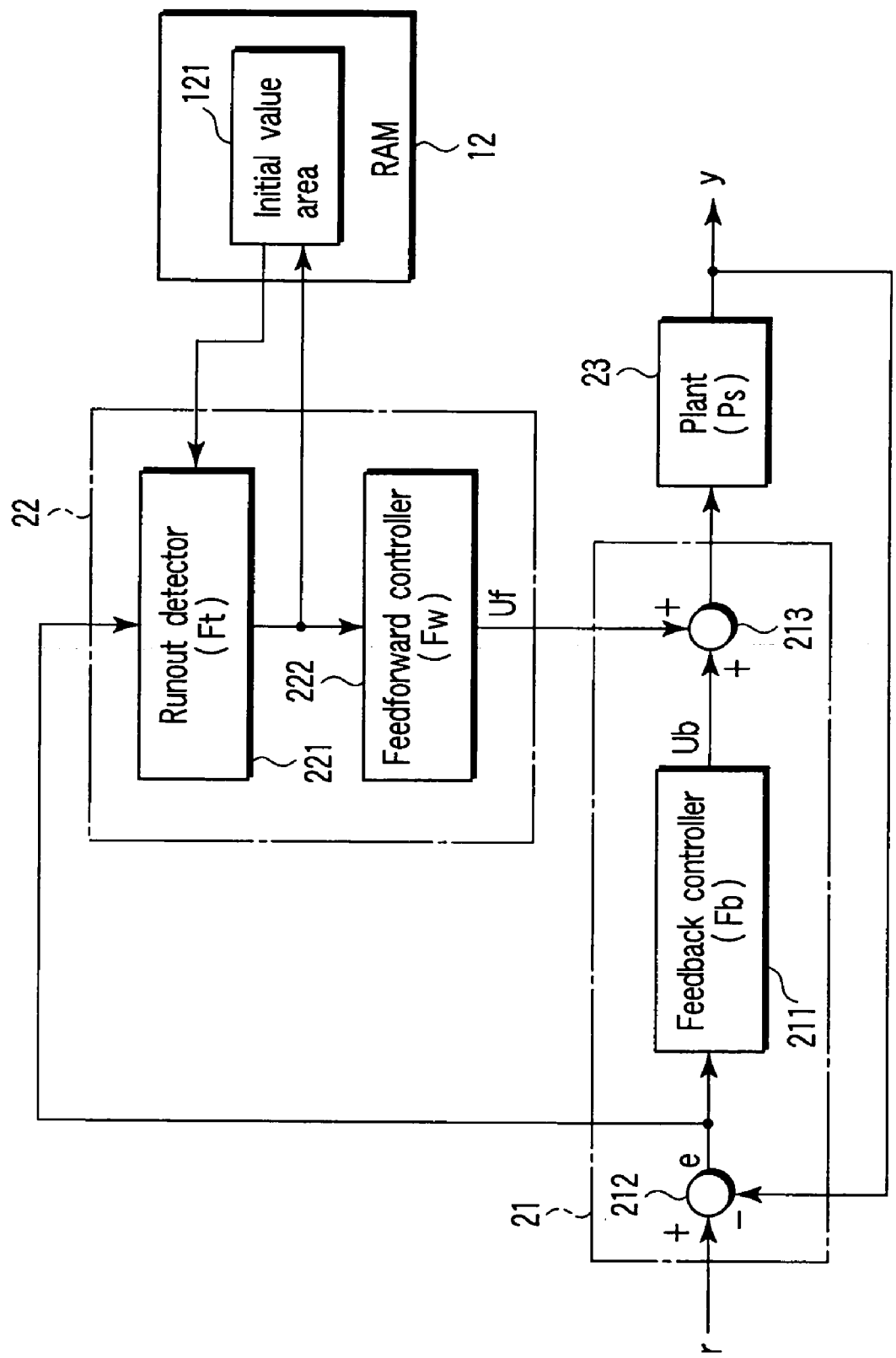
F I G. 2

APPARATUS AND METHOD FOR CALCULATING DISK SHIFT AMOUNT IN DISK DRIVE

CROSS-REFERENCE TO RELATED APPLICATIONS

This application is based upon and claims the benefit of priority from prior Japanese Patent Application No. 2003-416142, filed Dec. 15, 2003, the entire contents of which are incorporated herein by reference.

BACKGROUND OF THE INVENTION

1. Field of the Invention

The present invention relates to a disk drive that performs seek control for moving a head to a target position on a disk rotated by a spindle motor and track following control for settling the head within a target range for the target position. In particular, the present invention relates to an apparatus and method for calculating a disk shift amount in a disk drive which apparatus and method are suitable for calculating the amount of disk shift resulting from an external impact while the disk drive is inactive.

2. Description of the Related Art

Hard disk drives are well known as using a disk as a recording medium. The hard disk drive generally comprises a head positioning control system (servo system) that performs control for positioning a head at a target position on the disk. This control system handles an actuator in which the head is mounted, as a to-be-controlled object (that is, a plant). The actuator supports the head such that the head is movable in a radial direction of the disk. The control system controls driving of the actuator on the basis of servo information written (embedded) in the disk. The control system performs seek control for a seek operation of moving the head to a target track and track following control for a track following operation (tracking operation) of settling the head moved to the target track within a target range for the target track.

A disk runout that may occur as the disk rotates is known as a factor degrading the track following performance of the hard disk drive. The disk runout may result from, for example, an assembly error in the hard disk drive. The term "assembly error" as used in the specification refers to an error that may occur when the disk is screwed onto a hub of a spindle motor during a process for manufacturing the hard disk drive. With the track following control, the disk runout appears as the runout of a track. Accordingly, the head must be allowed to follow the runout. The component of the disk runout (runout component) is contained in a position error that may occur when the head is allowed to follow the target track. Thus, Jpn. Pat. Appln. KOKAI Publication No. 11-39814 (Document 1) discloses a technique for detecting the runout component of the disk runout that may occur in synchronism with the rotation of the disk to eliminate the runout component from the position error. The technique described in Document 1 can suppress the runout component for the track, which is in synchronism with the rotation of the disk, to reduce a tracking error that may occur in the tracking by the head.

The runout component is detected by adaptive learning. An initial value is required to carry out the adaptive learning in a short time. Thus, Jpn. Pat. Appln. KOKAI Publication No. 2002-230928 (Document 2) discloses learning of the runout component for each pre-specified radial position on the disk during the manufacture of the hard disk drive. Document 2 further discloses a technique for using, as an initial value for the adaptive learning, the runout component for each pre-specified radial position on the disk obtained through the learning during the manufacture of the hard disk drive (this runout component is called a learned value). The initial value for the adaptive learning is stored in a nonvolatile memory. Document 2 takes a temporal variation in the runout component for each radial position into consideration. Document 2 thus proposes that the learned value for the runout component for each radial position, which is used as an initial value for the adaptive learning, be corrected when the hard disk drive is activated. In this case, the runout component for a particular radial position of the disk is relearned. Then, the learned value (initial value) for the runout component for each radial position of the disk is corrected utilizing the rate of a change from the original learned value to the relearned value (or the difference between the original learned value and the relearned value). With the technique described in Document 2 (prior art), the head can be caused to precisely follow the target track without being affected by the runout of a track in synchronism with the rotation of the disk or by a temporal variation in the runout component.

When the hard disk drives incurs an excessive external impact, the center of the disk in the disk drive may be shifted from the rotating shaft of the spindle motor, that is, what is called a disk shift may occur. In this case, a very long time is required for the convergence of the learning of the runout component, which is carried out during the activation of the hard disk drive. In other words, the time required to activate the disk drive increases. However, the above prior art cannot determine whether the increase in activation time results from a disk shift or another factor. For example, the prior art cannot determine whether or not the increase in activation time results from a disk shift caused by an impact made (for example, the impact made when the disk drive falls) while the hard disk drive is inactive, the impact exceeding a value specified for the product. The factor mentioned above includes vibration externally applied to the disk drive or a defect in the actuator, which supports the head such that the head is movable.

BRIEF SUMMARY OF THE INVENTION

In accordance with an embodiment of the invention, there is provided a disk drive which performs seek control for moving a head to a target position on a disk rotated by a spindle motor and track following control for settling the head within a target range for the target position. The disk drive comprises a position error detector configured to detect a position error between a position of the head and the target position, an adaptive learning device configured to acquire, through adaptive learning, a runout component of a disk runout which may occur as the disk rotates, the runout component being contained in the position error detected, a nonvolatile storage device to which a learned value for the runout component acquired by the adaptive learning device through the adaptive learning during manufacture of the disk drive is pre-saved, a main controller which controls relearning of the runout component by the adaptive learning device to acquire a relearned value for the runout component during activation of the disk drive, the learned value for the runout component saved to the nonvolatile storage device being used as an initial value for the adaptive learning during the relearning of the runout component, and a calculating device configured to calculate a disk shift amount on the basis of the relearned value and the original learned value corresponding to the relearned value, the disk shift amount representing a shift in a center of the disk from a rotation center of the spindle motor and from the center of the disk set during the manufacture of the disk drive.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram illustrating the concept of a servo system realized by a CPU 10 by executing a control process, the CPU 10 appearing in FIG. 1;

DETAILED DESCRIPTION OF THE INVENTION

Figure 1:
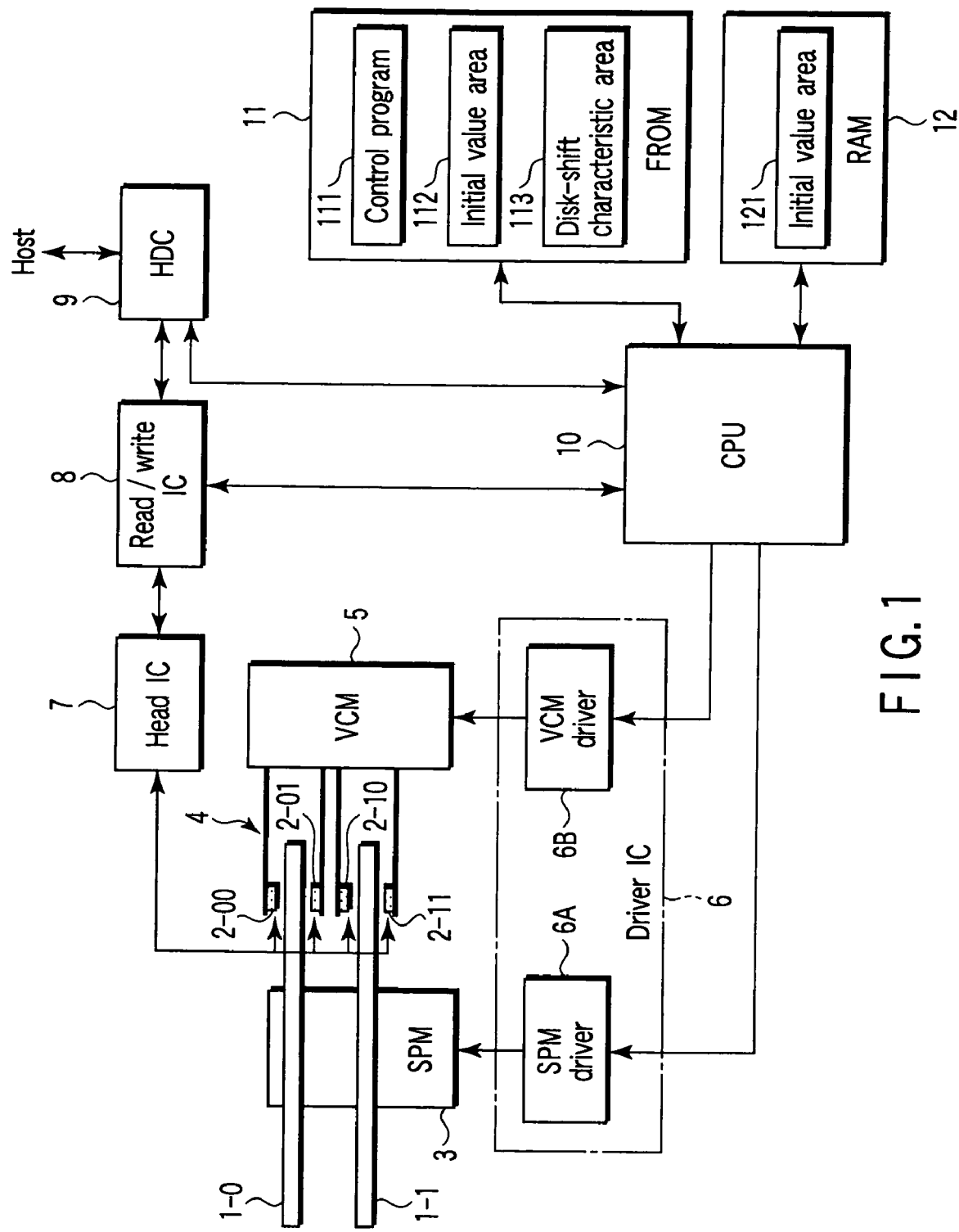
FIG. 1 is a block diagram showing the configuration of a hard disk drive according to an embodiment of the present invention.

With reference to the drawings, description will be given below of an embodiment in which the present invention has been applied to a hard disk drive. The hard disk drive (HDD) shown in FIG. 1 comprises, for example, two disks (magnetic disks) 1-0 and 1-1 on which data is magnetically recorded. Each disk 1-$i$ (i=0, 1) has two disk surfaces: a top and bottom surface. At least one of the two disk surfaces of each disk 1-$i$, for example, both disk surfaces serve as recording surfaces on which data is recorded. Heads (magnetic heads) 2-00 and 2-01 are arranged in association with the respective recording surfaces of the disk 1-0. Likewise, heads 2-10 and 2-11 are arranged in association with the respective recording surfaces of the disk 1-1. Each head 2-$ij$ (i=0, 1, j=0, 1) is used to read and write data from and to the disk 1-$i$. In FIG. 1, it is assumed that the two disks 1-0 and 1-1 are stacked in the HDD. However, the HDD may comprise three or more disks or a single disk.

A large number of concentric tracks (not shown) are arranged on the recording surfaces of each disk 1-$i$. In each track, servo areas in which servo information is recorded are arranged discretely at regular intervals. In other words, in the present embodiment, a sector servo type format is applied to each disk 1-$i$. The servo information contains position information required to perform control for positioning the head 2-$ij$ in a target track. The position information contains a cylinder code and burst data. The cylinder code indicates the position of a cylinder (track) on the disk 1-$i$ in which the corresponding servo information is written. The burst data is position information indicative of the relative position (position error) of the head. in the cylinder in which the corresponding servo information is written.

A spindle motor (SPM) 3 rotates each disk 1-$i$ at high speed. An actuator 4 supports each head 2-$ij$ such that the head is movable in a radial direction of the disk 1-$i$. The actuator 4 includes a voice coil motor (VCM) 5 serving as a driving source for the actuator 4. The SPM 3 is driven by a driving current (SPM current) supplied by an SPM driver 6A. The VCM 5 is driven by a driving current (VCM current) supplied by a VCM driver 6B. In the present embodiment, the SPM driver 6A and the VCM driver 6B are realized by a driver IC 6 composed of a single chip.

Each head 2-$ij$ is connected to a head IC (head amplifier circuit) 7. The head IC 7 includes a read amplifier that amplifies a read signal read by the head 2-$ij$ and a write amplifier that converts write data into a write current. The head IC 7 is connected to a read/write IC (read/write channel) 8. The read/write IC 8 is a signal processing device for performing various kinds of signal processing such as analog-to-digital conversion of a read signal, encoding of write data, decoding of read data, etc. The read/write IC 8 also extracts the cylinder code and burst data from the servo information. The read/write IC 8 then transmits the cylinder code and burst data extracted to a CPU 10.

The read/write IC 8 is connected to a disk controller (HDC) 9 and the CPU 10. The HDC 9 is connected to a host (host system) and the CPU 10. The host is a digital apparatus such as a personal computer which utilizes the HDD shown in FIG. 1. The HDC 9 has an interface control function for controlling the reception of a command (read/write commands and the like) as well as data transfers between the host and the HDC 9. The HDC 9 also has a disk control function for controlling data transfers between the disk 1-$i$ and the HDC 9.

The CPU 10 is a main controller in the HDD shown in FIG. 1. The CPU 10 is connected to a flash read-only memory (FROM) 11 and a random access memory (RAM) 12. The FROM 11 is a nonvolatile memory in which a control program 111 executed by the CPU 10 is pre-stored. The control program 111 includes a control process for a servo system. Control realized by the CPU 10 by executing the control process includes seek control for a seek operation for moving the head 2 to a target track on the basis of a cylinder code transmitted by the read/write channel 8. The control realized by the CPU 10 by executing the control process also includes track following control for a track following operation for positioning the head 2-$ij$ within a target range for the target track on the basis of burst data transmitted by the read/write channel 8. A storage area in the FROM 11 is partly used as an initial value area 112. A learned value for a runout component is pre-saved to the initial value area 112 as an initial value for adaptive learning. The learned value for the runout component is acquired for each pre-specified zone on each recording surface of each disk 1-$i$ during the manufacture of the HDD shown in FIG. 1. A storage area in the RAM 12 is partly used as an initial value area 121 to which the contents of the initial value area 112 of the FROM 11 are copied when the HDD shown in FIG. 1 is activated. The contents of the initial value area 121 are changed (corrected) during the activation of the HDD. Description will be given later of the learned value for the runout component stored in the initial value areas 112 and 121.

FIG. 2 is a block diagram illustrating the concept of the servo system realized by the CPU 10 by executing the control process, the CPU 10 appearing in FIG. 1. The servo system shown in FIG. 2 is a head positioning control system for positioning the head 2-*ij* at a target position on the disk 1-*i*. The servo system comprises a feedback control system 21 and a learning type feedforward control system 22. The feedback control system 21 performs control for driving a plant 23 (in this case, the actuator 4 or VCM 5). The feedback control system 21 comprises a feedback controller (Fb) 211, a position error detector 212, and an adder 213. The feedforward control system 22 suppresses (compresses) the component of runout of a track which may occur in synchronism with the rotation of the disk 1-*i*. The feedforward control system 22 comprises a runout detector (Ft) 221 and a feedforward controller (Fw) 222.

In the feedback control system 21, the position error detector 212 detects a position error "e" between a target position "r" on the disk 1-*i* and the position of the head 2 (head position) "y". In the seek control, the target position "r" is a target track. In the track following control, the target position is, for example, a center line of the target track. In the track following control, the position error "e" between the target position "r" and the head position "y" is indicated by an analog-to-digital conversion value for the amplitude of burst data (burst signal) extracted by the read/write channel 8. On the basis of the position error "e" detected by the position error detector 212, the feedback controller 211 calculates a first control amount (feedback value) Ub required to suppress the position error "e".

In contrast, in the feedforward control system 22, the runout detector 221 executes a digital Fourier transformation (DFT) calculation to detect (calculate) a runout component contained in the position error "e" (the runout component in synchronism with the rotation of the disk 1-*j*). In the HDD according to the present embodiment, a sector servo type format is applied to the disk 1-*i*. Servo information is thus discretely detected. Consequently, the position error "e" is detected at each sampling time when the servo information is detected. Thus, every time the position error detector 212 detects the position error "e", the runout detector 221 detects (calculates) the runout component contained in the position error "e" on the basis of the position error "e" and the result (learned value) of detection obtained by the runout detector 221 one sampling earlier. In other words, the runout detector 221 is an adaptive learning device that determines the runout component contained in the position error "e" through the adaptive learning. In this case, when determined, the runout component is separated into a sine component and a cosine component. The initial value of the learned value for the runout component is one of the learned values stored in the initial value area 121 of the RAM 12 which corresponds to a recording surface and zone to which the target position "r" belongs.

The runout component detected (calculated) by the runout detector 221 through the adaptive learning is output to the feedforward controller 222. Further, during the seek control, the runout detector 221 disables an adaptive learning function and outputs the initial value for the runout component (adaptive learned value) to the feedforward controller 222 as it is. On the basis of the runout component detected by the runout detector 221, the feedforward controller 222 calculates a second control amount (feedforward value) Uf required to suppress the runout component (that is, eliminates the runout component contained in the position error "e"). The adder 213 of the feedback control system 21 adds the control amount Uf calculated by the feedforward controller 222 to the control amount Ub calculated by the feedback controller 211. The feedback control system 21 uses the result of the addition (Uf+Ub) by the adder 213 as a third control amount required to control the plant 23.

Specifically, the adder 213 is used as a device that generates the third control amount (Uf+Ub).

Figures 3, 4:
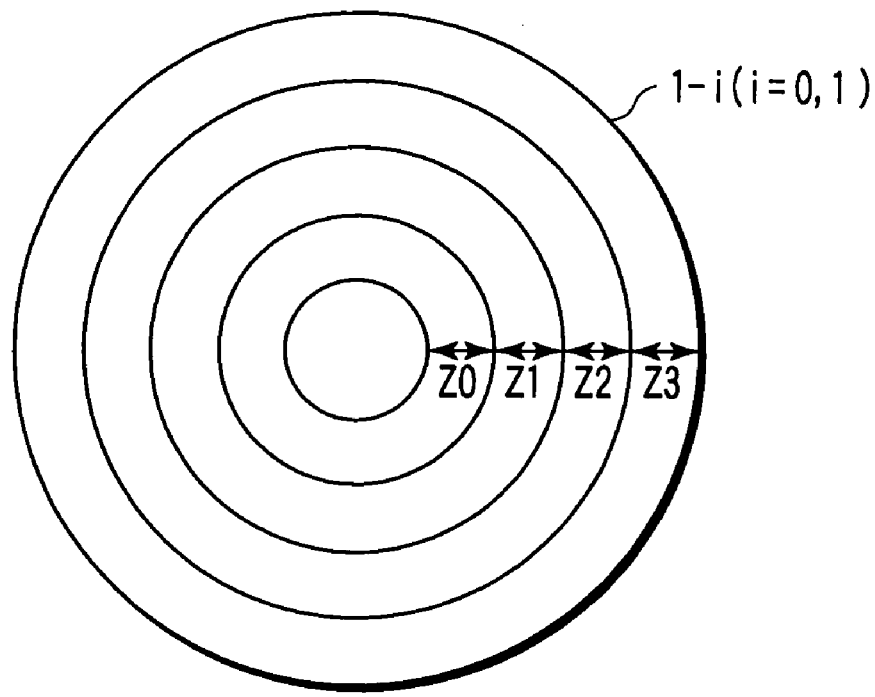
FIG. 3 is a diagram showing an example of zones assigned to each recording surface of each disk 1-$i$ (i=0, 1) appearing in FIG. 1.
FIG. 4 is a diagram showing an example of a data structure in an initial value area 112 (121) of an FROM 11 (RAM 12) appearing in FIG. 1.

As previously described, the learned value for the runout component is pre-saved to the initial value area 112 of the FROM 11 in association with each zone of each recording surface of each disk 1-*i* acquired during the manufacture of the HDD shown in FIG. 1. In contrast, during the activation of the HDD, the contents of the initial value area 112 of the FROM 11 are copied to the initial value area 121 of the RAM 12. FIG. 3 shows an example of zones assigned to each recording surface of each disk 1-*i*. In this case, each recording surface of each disk 1-*i* is partitioned into four concentric zones Z0 to Z3 for management. FIG. 4 shows an example of a data structure in the initial value area 112 (121). In the example shown in FIG. 4, the learned values for the runout components are stored in the initial value area 112 (121) in table form. In FIG. 4, head numbers denote identification numbers that identify the recording surfaces of the disk 1-*i*. The head numbers 0, 1, 2, and 3 identify the recording surfaces corresponding to the heads 2-00, 2-01, 2-10, and 2-11, respectively. Zone numbers 0, 1, 2, and 3 identify the zones Z0, Z1, Z2, and Z3, respectively.

Now, a brief description will be given of learning of the runout component carried out during the manufacture of the HDD shown in FIG. 1. During the manufacture of the HDD, the HDD is set in a mode for learning the runout component, in response to an instruction from the host. Then, the CPU 10 executes the control process in the control program 111 to start learning the runout component. Specifically, the CPU 10 utilizes the system shown in FIG. 2 to start learning the runout component. In this learning, for each zone of each recording surface, the CPU 10 designates an almost central track in the zone as a target track. Then, the CPU 10 utilizes the system shown in FIG. 2 to perform seek control for moving the head 2-*ij* to a target track and track following control for settling the head 2-*ij* moved to the target track within a target range for the target track. In the track following control, every time the position error detector 212 detects the position error "e", the runout detector 221 determines the runout component contained in the position error "e". In this case, the digital Fourier transformation calculation is used to detect (calculate) the runout component through the adaptive learning, on the basis of the position error "e" and the result (learned value) of detection obtained by the runout detector 221 one sampling earlier. More specifically, when determined, the runout component for each order from 1st to n-th orders (n is an integer larger than one) is separated into a sine component and a cosine component. For example, zero is used as an initial value for the adaptive learning by the runout detector 221. Then, the runout component detected while the head 2-*ij* is settled in the target range for the target track is determined to be a learned value for the runout component for the corresponding zone of the corresponding recording surface. The learned value for each zone of each recording surface determined as described above is saved to the initial value area 112 of the FROM 11 as an initial value for the adaptive learning as shown in FIG. 4.

Figure 5:
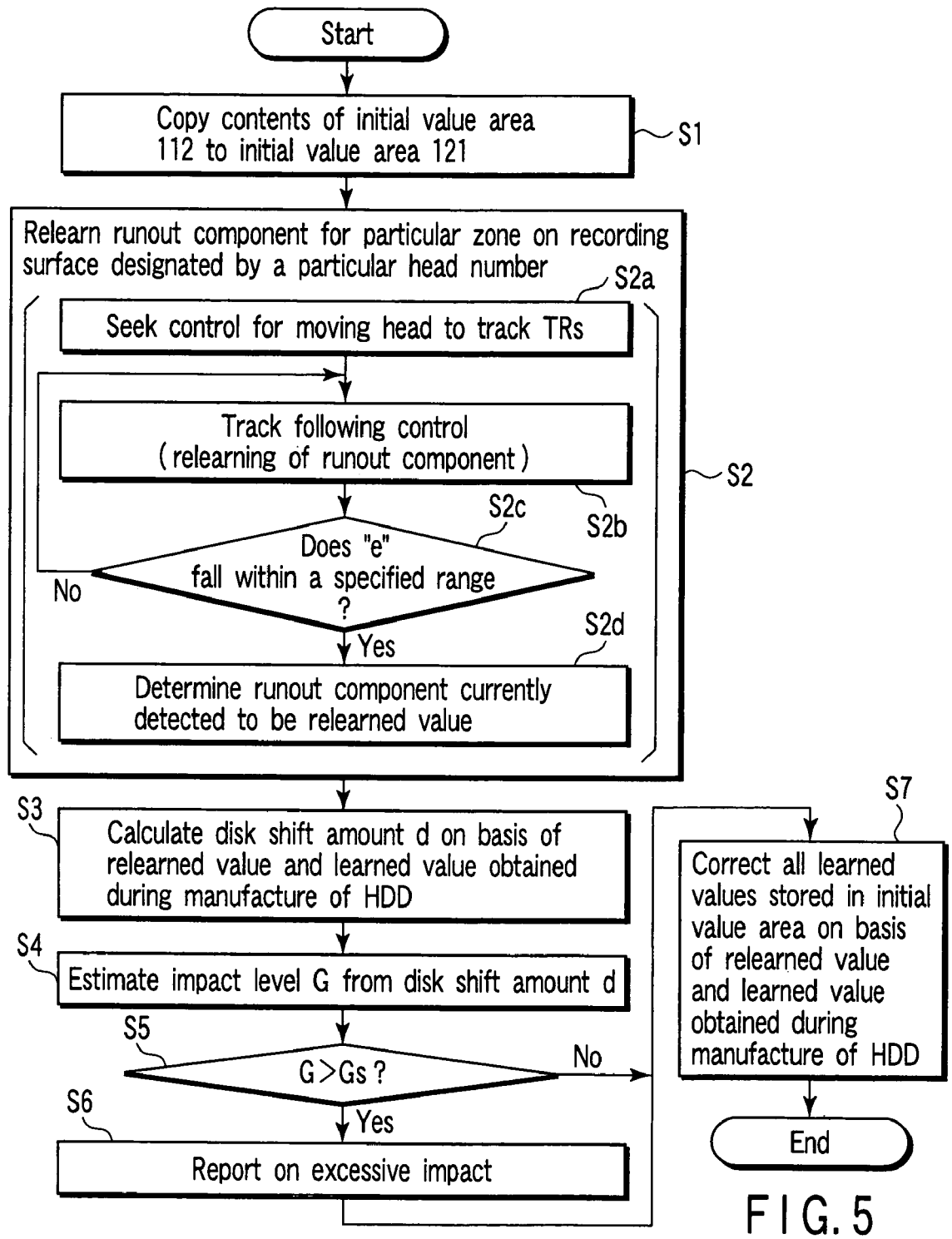
FIG. 5 is a flowchart showing the procedure of a process for correcting an initial value for adaptive learning which process is executed during activation of an HDD in FIG. 1.

Now, with reference to the flowchart in FIG. 5, description will be given of a process for correcting the initial value for the adaptive learning, which process is executed during the activation of the HDD shown in FIG. 1. This process is characterized by including a procedure for calculating the disk shift amount on the basis of a change in the initial value for the adaptive learning. First, during the activation of the HDD shown in FIG. 1, the CPU 10 copies the learned values (initial values) saved to the initial value area 112 of the FROM 11, to the initial value area 121 of the RAM 12 (step S1). Then, the CPU 10 utilizes the system shown in FIG. 2 to perform control for relearning the runout component (step S2). Here, the runout component for a particular zone Zk (for example, the zone Z2) on the recording surface designated by a particular head number (for example, the head number 0) is relearned. The details of the control performed in step S2 are as follows.

First, the CPU 10 performs control (seek control) for a seek operation for moving the head 2-*ij* to a particular track TRs as a target track (step S2*a*). Specifically, to relearn the runout component for the track TRs, the CPU 10 performs seek control for moving the head 2-*ij* (in this case, the head 2-00) to the track TRs. The track TRs belongs to the zone Zk on the recording surface designated by the particular head number. The track TRs is preferably used to learn the runout component for the zone Zk on the recording surface designated by the particular head number, during the manufacture of the HDD.

When the head 2-*ij* is moved to the track TRs, the CPU 10 utilizes the system shown in FIG. 2 to start the track following control for settling the head 2-*ij* within a predetermined range for the track TRs (step S2*b*). In the track following control, the position error detector 212 detects the position error "e" at each sampling time. Every time the position error detector 212 detects the position error "e", the runout detector 221 detects the runout component contained in the position error "e", through the adaptive learning. Specifically, the runout detector 221 detects the runout component contained in the position error "e" on the basis of the position error "e" and the result (learned value) of detection obtained by the runout detector 221 one sampling earlier. In this case, the initial value for the adaptive learning is one of the learned values stored in (copied to) the initial value area 121 of the RAM 12 which corresponds to the zone Zk on the particular recording surface. The particular recording surface is designated by the particular head number.

On the basis of the runout component detected by the runout detector 221, the feedforward controller 222 calculates the control amount Uf required to suppress the runout component. In contrast, on the basis of the position error "e" detected by the position error detector 212, the feedback controller 211 calculates the control amount Ub required to suppress the position error "e". The adder 213 adds the control amounts Uf and Ub together. The result of the addition (Uf+Ub) by the adder 213 is used as a control amount (third control amount) required to control the plant 23. In this case, the CPU 10 provides the VCM driver 6B of the driver IC 6 with the control amount, i.e., the result of the addition by the adder 213. The VCM driver 6B drives the VCM 5 by supplying the VCM 5 with a VCM current corresponding to the control amount provided by the CPU 10. In this manner, the track following control (step S2*b*) is performed to settle the head 2-*ij* within the target range for the track TRs.

The CPU 10 determines whether or not the position error "e" has been converged within the specified range by the track following control (step S2*c*). If the position error "e" is not within the specified range, the CPU 10 continues the track following control (step S2*b*). In contrast, if the position error "e" is within the specified range, the CPU 10 determines that the head 2-*ij* has been settled within the target range for the track TRs. In this case, the CPU 10 determines that the runout component has been completely relearned. The CPU 10 also determines the runout component currently detected by the runout detector 221 to be a relearned value for the runout component (step S2*d*).

In the present embodiment, the runout detector 221 executes the digital Fourier transformation conversion to determine a runout component (learned value) for each order from 1st to n-th orders. More specifically, when determined, the runout component for each order is separated into a sine component and a cosine component. In general, a disk shift appears in the first order component. In contrast, the runout component (that is, the learned value for the adaptive learning) detected by the runout detector 221 corresponds to a position error that remains in spite of the feedback control performed by the feedback controller 211. The feedback control is performed to suppress the position error "e" between the target position "r" and the head position "y". Thus, when the relearned value for the runout component is determined in step S2*d*, the relearned value (that is, the remaining position error) can be used to estimate the trajectory of the actual target position. Specifically, the trajectory of the actual target position can be estimated by multiplying the relearned value by the reciprocal of a suppression rate used when the position error is suppressed by the feedback control performed by the feedback controller 211. The trajectory represents the runout itself of the disk 1-*i*. Therefore, the CPU 10 can determine that the disk shift amount has changed, by detecting a change in trajectory.

A current shift in the center $O_1$ of the disk 1-*i* from the rotation center (rotating shaft) O of the SPM 3 is called a disk shift amount $ds_1$. The rotation center O of the SPM 3 is an absolute center used if a shift in the center $O_1$ of the disk 1-*i* is considered. The disk shift amount $ds_1$ can be calculated on the basis of the first order component (first order sine and cosine components) of the relearned value for the runout component determined in step S2*d*. Specifically, the disk shift amount $ds_1$ can be calculated in accordance with an equation shown below provided that the first order sine and cosine components of the relearned value are represented by k sin 1 and k cos 1, respectively.

$$ds_1 = \alpha\{(k \sin 1)^2 + (k \cos 1)^2\}^{1/2} \quad (1)$$

In this case, α denotes a proportional coefficient reflecting the suppression rate.

Next, a shift in the center $O_0$ of the disk 1-*i* from the rotation center O of the SPM 3 which shift may occur during the manufacture of the HDD is called a disk shift amount $ds_0$. The disk shift amount $ds_0$ can be calculated on the basis of the first order component (first order sine and cosine components) of the learned value (original learned value) obtained during the manufacture of the HDD and corresponding to the relearned value. The learned value obtained during the manufacture of the HDD is saved to the initial value area 112 of the FROM 11. Specifically, the disk shift amount $ds_0$ can be calculated in accordance with an equation shown below provided that the first order sine and cosine components of the learned value obtained during the manufacture of the HDD are represented by k sin 0 and k cos 0, respectively.

$$ds_0 = \alpha\{(k \sin 0)^2 + (k \cos 0)^2\}^{1/2} \quad (2)$$

Product specifications for the HDD include impact resistance. A specified value (allowable level) Gs for the impact resistance of the HDD is generally set at about several hundred gal. Here, it is assumed that the HDD incurs an impact substantially exceeding the allowable level Gs, for example, when dropped. In such a case, a part of each disk 1-*i* which is screwed onto a hub of the SPM 3 may loosen. The center of the disk 1-*i* may thus shift from the rotation center of the SPM 3. The CPU 10 can determine the degree of the shift by comparing the disk shift amounts $ds_1$ and $ds_0$ with each other. That is, by comparing the disk shift amounts $ds_1$ and $ds_0$ with each other, the CPU 10 can determine that the status of the disk runout has been changed by an excessive impact externally made after the manufacture of the HDD.

Thus, the CPU 10 calculates a shift from the center $O_0$ of the disk 1-$i$ set during the manufacture of the HDD to the current center $O_1$ of the disk 1-$i$, that is, the disk shift amount d from the time of the HDD manufacture to the current time (step S3). The disk shift amount d can be calculated on the basis of the relearned values k sin 1 and k cos 1 and the learned values k sin 0 and k cos 0 obtained during the manufacture of the HDD. Here, the disk shift amount d is calculated by:

$$d = \alpha \{(k \sin 1 - k \sin 0)^2 + (k \cos 1 - k \cos 0)^2\}^{1/2} \quad (3)$$

In Equation (3), d can be converted into a physical distance (μm) by selecting an appropriate value for $\alpha$.

Figure 6:
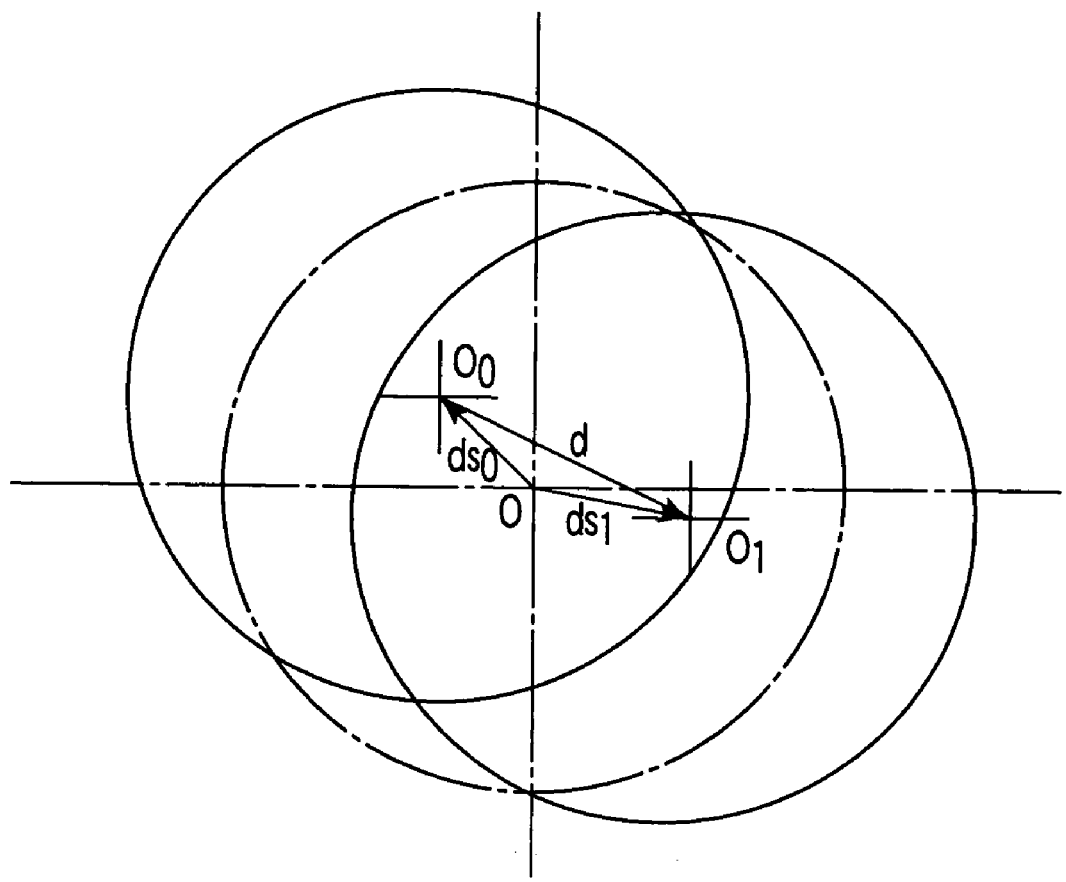
FIG. 6 is a diagram showing the concept of a disk shift associated with disk shift amounts $ds_0$, $ds_1$, and d.
Figure 7:
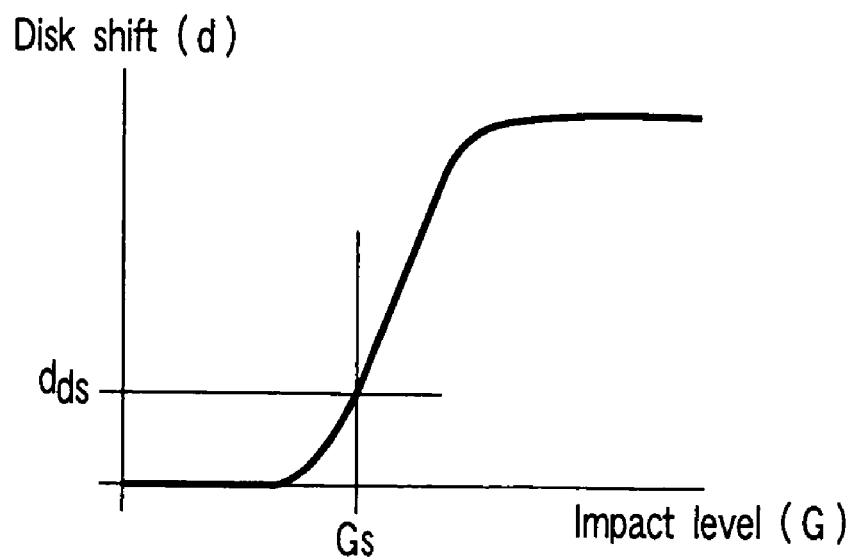
FIG. 7 is a graph showing the correspondence between an impact level and the disk shift amount.

FIG. 6 shows the concept of the above disk shift in association with the disk shift amounts $ds_0$, $ds_1$, and d. There is a correlation between the disk shift amount and the level of an external impact (impact level) exerted on the HDD. By pre-measuring such a correlation in a large number of HDDs, it is possible to acquire an impact level-disk shift amount characteristic such as the one shown in FIG. 7. This characteristic can be utilized to estimate the magnitude of the impact exerted on the HDD, from the disk shift amount. Thus, in the present embodiment, a part of the storage area of the FROM 11 is used as a disk-shift characteristic area 113 (see FIG. 1). Disk shift characteristic information is pre-saved to the area 113. The disk shift characteristic information represents the relationship between the impact level and the disk shift amount shown in FIG. 7. In this case, the upper limit of the disk shift amount is the difference between inner diameter of the disk 1-$i$ and the outer diameter of the hub.

It is assumed that the CPU 10 has calculated the disk shift amount d in accordance with Equation (3) (step S3). Then, the CPU 10 estimates the level of an impact (impact level) G that has caused a disk shift of the disk shift amount d (step S4). The impact level G is estimated on the basis of a disk shift characteristic indicated by the disk shift characteristic information saved to the disk-shift characteristic area 113 of the FROM 11 as well as the disk shift amount d calculated in step S3. The CPU 10 compares the impact level G estimated with the allowable level Gs of the impact resistance. The CPU 10 thus determines whether or not the HDD has undergone an impact exceeding the value Gs while inactive (step S5). A disk shift amount obtained when the HDD incurs an impact of the level Gs is defined as $d_{ds}$. Then, the disk shift amount $d_{ds}$ can be predicted from the characteristic shown in FIG. 7. It is thus possible to store the information indicative of the disk shift amount $d_{ds}$ in, for example, the FROM 11 and to check whether or not the disk shift amount d calculated in step S3 is larger than the disk shift $d_{ds}$ indicated by the information. This makes it possible to determine (estimate) that the HDD has incurred an impact exceeding the allowable level Gs, if $d > d_{ds}$.

If the HDD is estimated to have undergone an excessive impact exceeding the allowable level Gs of the impact resistance, the reliability of the HDD is not ensured. In this case, the CPU 10 reports to a user (maintenance personnel) of the host via the host that the HDD has undergone the excessive impact (step S6). Thus, the user can deal with the situation by for example, performing an operation for backing up the data saved to the HDD. Further, even if a disk shift substantially exceeding the value $d_{ds}$ significantly increases the time required to activate the HDD, the user can immediately determine the cause of the abnormal state. Similarly, even if a disk shift substantially exceeding the value $d_{ds}$ leads to an abnormal state in which data cannot normally be read from the HDD or backed up, the user can immediately determine the cause of the abnormal state. If the HDD incurs an external impact while operating, then for example, an impact sensor can detect this impact.

Then, on the basis of the relearned value for the runout component determined in step S2d and the original learned value used before the relearning (that is, the learned value obtained during the manufacture of the HDD), the CPU 10 corrects all the learned values obtained during the manufacture of the HDD and stored in (copied to) the initial value area 121 of the RAM 12 (step S7). The correction can be accomplished by for example, adding the difference between the relearned value and the original learned value to each learned value obtained during the manufacture of the HDD. Alternatively, each learned value obtained during the manufacture of the HDD may be corrected by determining the rate of a change from the original learned value to the relearned value to multiply each learned value obtained during the manufacture of the HDD, by this change rate.

The above embodiment applies the configuration in which the relearning of the runout component is intended for the particular recording surface of the particular disk. However, the runout component may be relearned for each disk 1-$i$ (or each recording surface of each disk 1-$i$). In this case, each learned value obtained during the manufacture of the HDD may be corrected for each disk 1-$i$ (or each recording surface of each disk 1-$i$) using the corresponding relearned value. This makes it always possible to correct the learned value for the runout component, used as an initial value for the adaptive learning, to the optimum value even if a temporal variation in runout component varies in each disk 1-$i$ (or each recording surface of each disk 1-$i$). In this case, the disk shift amount d can be calculated for each disk 1-$i$ (or each recording surface of each disk 1-$i$). It is thus possible to determine whether or not the HDD has incurred an impact exceeding the level Gs, using one of the disk shift amounts calculated which has the largest value. Consequently, even if the disk shift amount varies in each disk 1-$i$ (or each recording surface of each disk 1-$i$), a warning can be given to the user provided that at least one of the disk shift amounts exceeds the value $d_{ds}$. The CPU 10 may also give a warning to the user in the following case: the CPU 10 determines for each disk shift amount d calculated whether or not the HDD has undergone an impact exceeding the level Gs, and the number of disk shift amounts with which the HDD has undergone an impact exceeding the level Gs is larger than a pre-specified value. Further, in the above embodiment, the present invention is applied to a hard disk drive (HDD). However, the present invention is applicable to a disk drive other than a hard disk drive, such as a magneto-optical disk drive, provided that the disk drive performs the seek control and track following control.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive which performs seek control for moving a head to a target position on a disk rotated by a spindle motor and track following control for settling the head within a target range for the target position, the disk drive comprising:
   a position error detector configured to detect a position error between a position of the head and the target position;
   an adaptive learning device configured to acquire, through adaptive learning, a runout component of a disk runout which may occur as the disk rotates, the runout component being contained in the detected position error;
   a nonvolatile storage device to which a learned value for the runout component acquired by the adaptive learning device through the adaptive learning during manufacture of the disk drive is pre-saved;
   a main controller which controls relearning of the runout component by the adaptive learning device to acquire a relearned value for the runout component during activation of the disk drive, the learned value for the runout component saved to the nonvolatile storage device being used as an initial value for the adaptive learning during the relearning of the runout component; and
   a calculating device configured to calculate a disk shift amount on the basis of the relearned value and the original learned value corresponding to the relearned value, the disk shift amount representing a shift in a center of the disk from a rotation center of the spindle motor and from the center of the disk set during the manufacture of the disk drive,
   wherein the learned value contains a first order component of the runout component that is separated into a sine component and a cosine component such that the calculating device calculates the disk shift amount in accordance with the following relationship: $d=\alpha\{(k \sin 1 - k \sin 0)^2 + (k \cos 1 - k \cos 0)^2\}^{1/2}$
   where:
   k sin 1 and k cos 1 represent the first order sine component and cosine component of the relearned value, respectively,
   k sin 0 and k cos 0 represent the first order sine component and cosine component of the original learned value, respectively, and
   $\alpha$ represents a proportional coefficient.

2. The disk drive according to claim 1, further comprising an impact estimating device configured to estimate, on the basis of the disk shift amount calculated by the calculating device, whether the disk drive has undergone an impact exceeding an allowable level defined in a product specification for impact resistance.

3. The disk drive according to claim 2, wherein:
   characteristic information indicative of a relationship between a level of an impact exerted on the disk drive and the disk shift amount is pre-saved to the nonvolatile storage device; and
   the impact estimating device includes:
   (a) an impact level estimating device configured to estimate the impact level which causes a disk shift of the disk shift amount calculated, on the basis of the disk shift amount calculated by the calculating device and the characteristic information; and
   (b) a determining device configured to determine whether the impact level estimated by the impact level estimating device exceeds the allowable level.

4. The disk drive according to claim 2, wherein:
   information indicative of a disk shift amount predicted for a case in which the disk drive undergoes an impact equal to the allowable level is pre-saved to the nonvolatile storage device; and
   on the basis of the disk shift amount calculated by the calculating device and the information saved to the nonvolatile storage device and indicating the disk shift amount, the impact estimating device estimates whether the impact level causing a disk shift of the disk shift amount calculated exceeds the allowable level.

5. The disk drive according to claim 2, further comprising a reporting device configured to report to a host utilizing the disk drive that the impact estimating device has estimated that the disk drive has undergone an impact exceeding the allowable level.

6. The disk drive according to claim 1, further comprising:
   a feedback controller configured to calculate a first control amount required to suppress the position error;
   a feedforward controller configured to calculate a second control amount required to suppress a runout component acquired by the adaptive learning device; and
   a generating device configured to generate a third control amount required to settle the head within the target range for the target position on the basis of the first and second control amounts.

7. A method of calculating a disk shift amount, for use in a disk drive, the disk drive performing seek control for moving a head to a target position on a disk rotated by a spindle motor and track following control for settling the head within a target range for the target position, the method comprising:
   moving the head to a pre-specified target position on the disk during activation of the disk drive;
   performing, at regular sampling intervals, the track following control for settling the head moved to the target position, within a target range for the target position,
   acquiring, in a period of the track following control performed during activation of the disk drive, a runout component of a disk runout which may occur as the disk rotates, at each sampling time through adaptive learning, the runout component being contained in a position error between a position of the head detected at each sampling time and the target position, an initial value for the adaptive learning being a learned value for the runout component pre-saved to a nonvolatile storage device and acquired through the adaptive learning during manufacture of the disk drive;
   determining the runout component currently acquired to be a relearned value, if in the track following control performed during the activation of the disk drive, the position error converges within a pre-specified range; and
   calculating a disk shift amount based on the relearned value and the original learned value corresponding to the relearned value, the disk shift amount representing a shift in a center of the disk from a rotation center of the spindle motor and from the center of the disk set during the manufacture of the disk drive,
   wherein the learned value contains a first order component of the runout component that is separated into a sine component and a cosine component and the disk shift amount is calculated in accordance with the following relationship:

$d=\alpha\{(k \sin 1 - k \sin 0)^2 + (k \cos 1 - k \cos 0)^2\}^{1/2}$ where:
k sin 1 and k cos 1 represent the first order sine component and cosine component of the relearned value, respectively,
k sin 0 and k cos 0 represent the first order sine component and cosine component of the original learned value, respectively, and
α represents a proportional coefficient.

8. The method according to claim 7, further comprising estimating, on the basis of the calculated disk shift amount, whether the disk drive has undergone an impact exceeding an allowable level defined in a product specification for impact resistance.

* * * * *